United States Patent [19]

Khorram

[11] Patent Number: 5,264,850
[45] Date of Patent: Nov. 23, 1993

[54] HAND-HELD SOUND DIGITIZER SYSTEM
[75] Inventor: Ramin Khorram, Derry, N.H.
[73] Assignee: Arkay Technologies, Inc., Derry, N.H.
[21] Appl. No.: 790,550
[22] Filed: Nov. 12, 1991
[51] Int. Cl.[5] .................................... H03M 1/00
[52] U.S. Cl. ......................... 341/155; 381/168; 381/150
[58] Field of Search ............ 381/111, 112, 113, 114, 381/115, 168, 88, 150, 160; 341/155

[56] References Cited

U.S. PATENT DOCUMENTS

| | | | |
|---|---|---|---|
| 4,363,050 | 12/1982 | Modla | 360/32 |
| 4,677,657 | 6/1987 | Nagata et al. | 379/63 |
| 4,882,773 | 11/1989 | Maloney | 455/617 |
| 5,051,799 | 9/1991 | Paul et al. | 381/168 |

FOREIGN PATENT DOCUMENTS 55-134597  10/1980  Japan ................... 381/113

Primary Examiner—Howard L. Williams
Attorney, Agent, or Firm—Iandiorio & Dingman

[57] ABSTRACT

A hand-held sound digitizer system for recording sound in a personal computer, including an enclosure capable of being held in one hand, a microphone built into the enclosure for providing an analog sound signal output, and circuitry within the enclosure for digitizing the analog signal output. Further provision is made for reading the digitized signal to a parallel printer port of the computer for storage of the digitized sound in the computer.

17 Claims, 5 Drawing Sheets

Interrupt Routine

HAND-HELD SOUND DIGITIZER SYSTEM

FIELD OF INVENTION

This invention relates to a hand-held sound digitizer system that plugs into the parallel printer port of a personal computer.

BACKGROUND OF INVENTION

There are currently available several systems for recording sound in a personal computer. Some such devices internally digitize the sound and read it, under control of built-in control circuitry including oscillators, into the bi-directional serial port of a Macintosh microcomputer. This device cannot be used with IBM and compatible PCs that do not have the bidirectional serial port capable of sufficient performance for high quality voice digitizing. Other types of sound digitizing devices employ a circuit board that is put into an available slot within a personal computer; these systems then accept a microphone input at the computer connector for that port. These systems require that the user be technically capable of opening the computer and inserting the board into the slot, and also require that the computer have the right type of slot available. Accordingly, these devices decrease the number of other functional boards that may be plugged into the computer. Further, they cannot be used with laptop and notebook computers that do not have such internal slots.

Other sound digitization systems employ a large external free standing device that accepts a microphone input. The device has the internal oscillators and controls necessary to allow it to sample the input signal and digitize it with a parallel analog to digital (A/D) converter. The parallel data is decomposed into groups of four bits for reading into the computer through four available input pins in the parallel printer port. This system requires the user to supply a separate microphone, is large and cumbersome, complex and costly. Further, having the oscillator in the same enclosure with the sound signal processing circuitry contributes to signal noise, degrading sound quality.

SUMMARY OF INVENTION

It is therefore an object of this invention to provide a hand-held sound digitizer system.

It is a further object of this invention to provide such a system that is easily installed by even an unskilled user.

It is a further object of this invention to provide such a system that does not require the computer to be opened.

It is a further object of this invention to provide such a system that does not use available computer resources such as slots for accepting boards and computer interrupt lines.

It is a further object of this invention to provide such a system that may be used with any computer with a parallel printer port.

It is a further object of this invention to provide such a system that may be used with laptop and notebook computers.

It is a further object of this invention to provide such a system that may be used with both the IBM AT and Microchannel bus architecture.

It is a further object of this invention to provide such a system that produces high quality sound (at least 22K samples/second).

It is a further object of this invention to provide such a system that produces sound without any oscillator-induced noise.

It is a further object of this invention to provide such a system in which all the sound digitization control functions reside in software within the computer.

This invention results from the realization that a simple to use and inexpensive sound digitization system for use with personal computers may be accomplished by providing an external hand-held enclosure including a built-in microphone and serial A/D converter, and controlling the device with control signals generated in the computer under software control, to read the data into the computer memory through that computer's parallel printer port.

This invention may be accomplished with a hand-held sound digitizer system for recording sound in a personal computer that includes an enclosure capable of being held in one hand into which a microphone is built for providing an analog sound signal output. There are further included means within the enclosure for digitizing the analog signal output. Finally, the system includes means for providing the digitized output to a parallel printer port of the computer to store the digitized sound in the computer. Preferably, the analog signal is amplified before it is digitized; a three stage analog amplification circuit may be used for accomplishing the amplification. The analog signal is preferably digitized with a serial A/D converter in which the data is outputted serially either directly into the computer memory through the parallel printer port, or in groups of four bits at a time assembled in a shift register to increase the speed of operation. The digitization may be accomplished in conjunction with a pulse generator that provides a pulse to the A/D converter for generating a data bit from the analog output. In the embodiment in which a shift register is used to assemble groups of bits for transmission to the computer, the leading edge of the pulse may be used to enable the conversion, and the trailing edge to enable the reading of the bit from the A/D converter to the shift register.

DISCLOSURE OF PREFERRED EMBODIMENTS

Other objects, features and advantages will occur to those skilled in the art from the following description of preferred embodiments and the accompanying drawings, in which.

Figure 5A:
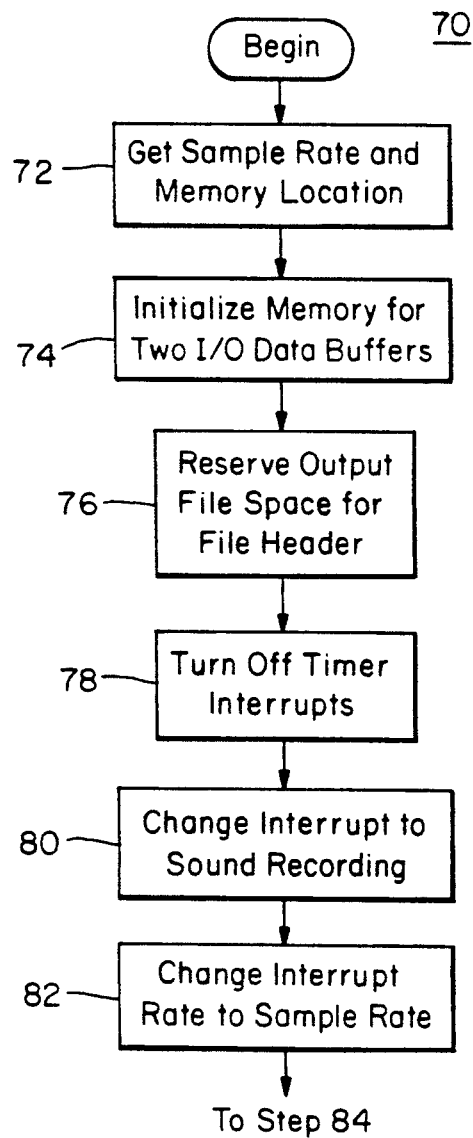
Figure 5B:
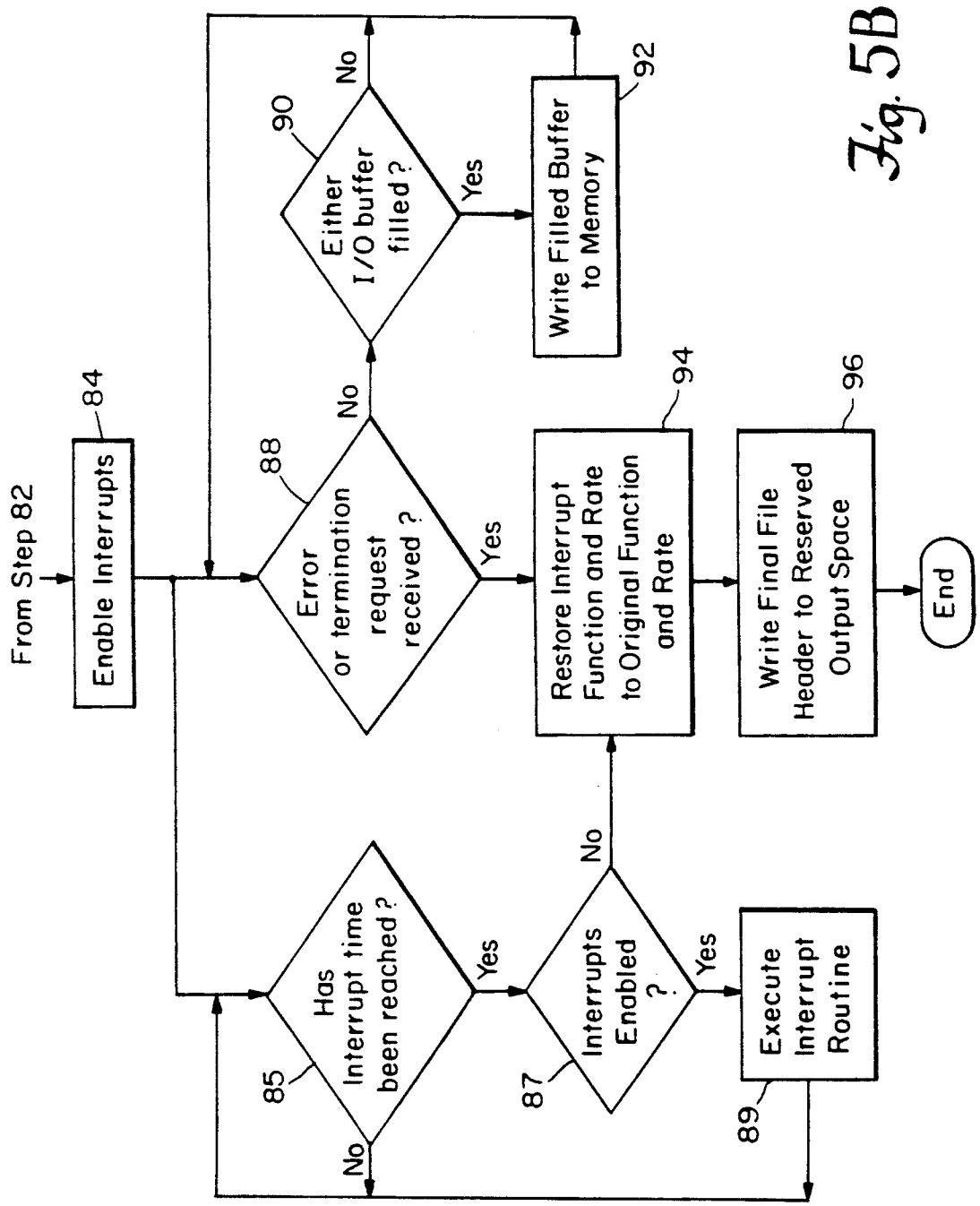
Figure 6:
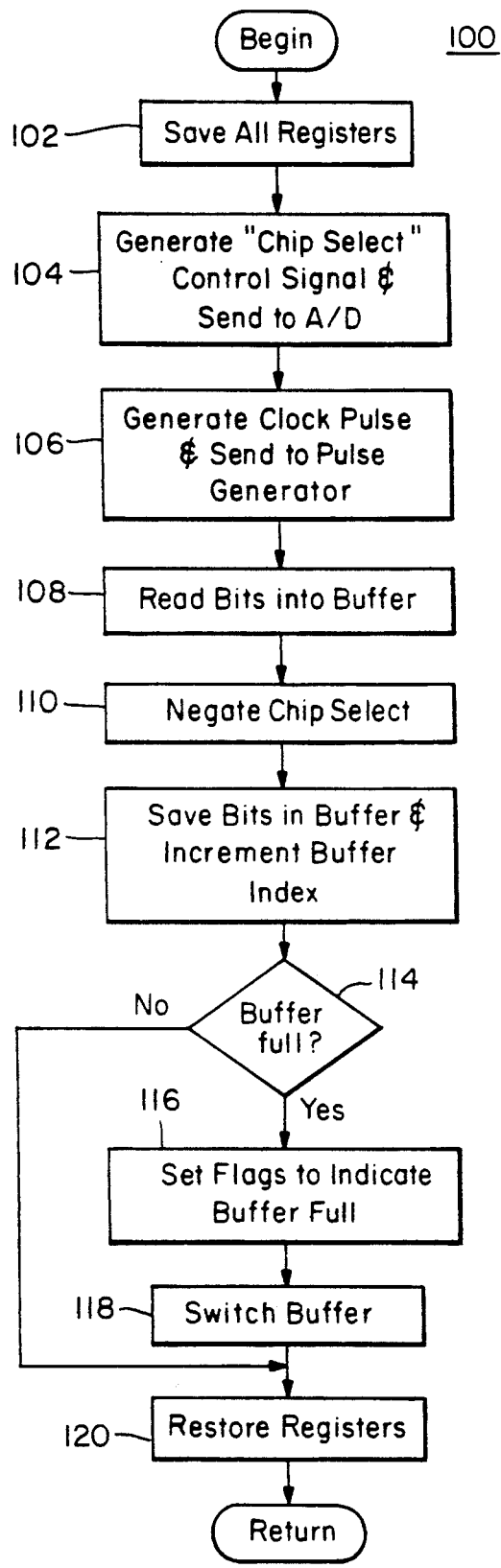

FIGS. 5A and 5B together are a flow chart for the main operating routine of the digitizer system according to this invention; and FIG. 6 is a flow chart of the interrupt routine accomplished by the main routine of FIGS. 5A and 5B.

This invention may suitably comprise a hand-held sound digitizer system that provides an easy means of recording sound in a personal computer through the parallel printer port normally used for output of data to a printer. The system may be accomplished with a small enclosure capable of being held in one hand that includes a built-in microphone and a serial A/D converter for digitizing the analog sound signal and providing sound bits that are read into the computer through the parallel printer port. Since the parallel printer port in IBM and compatible PCs typically includes at most five input pins, the data is read in serially, one bit at a time or in groups of up to four bits each, to make up eight-bit bytes in a preferred embodiment for high quality sound. The system accomplishes the control and timing functions with software that generates the necessary control signals using the computer's internal oscillator and supplies the signals to the external hand-held device through the parallel printer port. The system provides for the conversion of the analog sound signal into data bits, assembly of the bits as required, reading of the bits, singly or as assembled, through the parallel printer port into data buffers in the computer memory, and reading of filled buffers into storage as required to accept sound signals of indeterminate length having an upper limit established only by the sound sample rate and the amount of available computer data storage.

Figure 1:
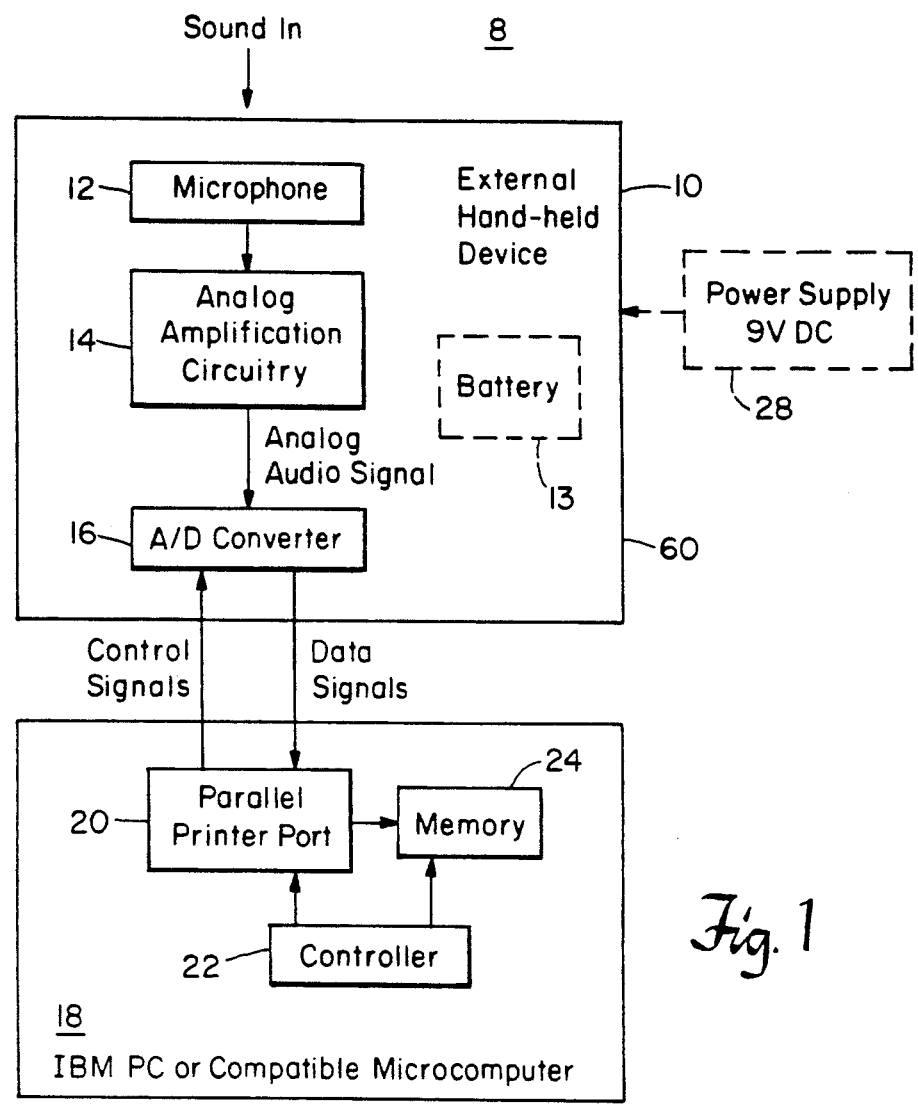
FIG. 1 is a schematic diagram of a hand-held sound digitizer system according to this invention.

There is shown in FIG. 1 hand-held sound digitizer system 8 according to this invention that includes external hand-held device 10 and controller 22 resident within computer 18. Device 10 includes small, hand-held enclosure 60 into which is built microphone 12 for accepting a sound signal and creating an analog signal output which is amplified by analog amplification circuitry 14 and supplied to serial A/D converter 16. Preferably, A/D 16 is an eight bit serial converter whose sample rate is controlled by control signals from controller 22 supplied through parallel printer port 20. Also under control of controller 22 the sound bits are read one at a time or in groups of four or less to make up eight bit digitized sound bytes. The manner in which the data is read through parallel printer port 20 into memory 24 is further described below. The circuitry within device 10 may derive power from a separate power supply such as nine volt DC power supply 28, internal battery 13, or, through an output pin or group of pins in parallel printer port 20 when sufficient power is available from the computer.

Figure 2:
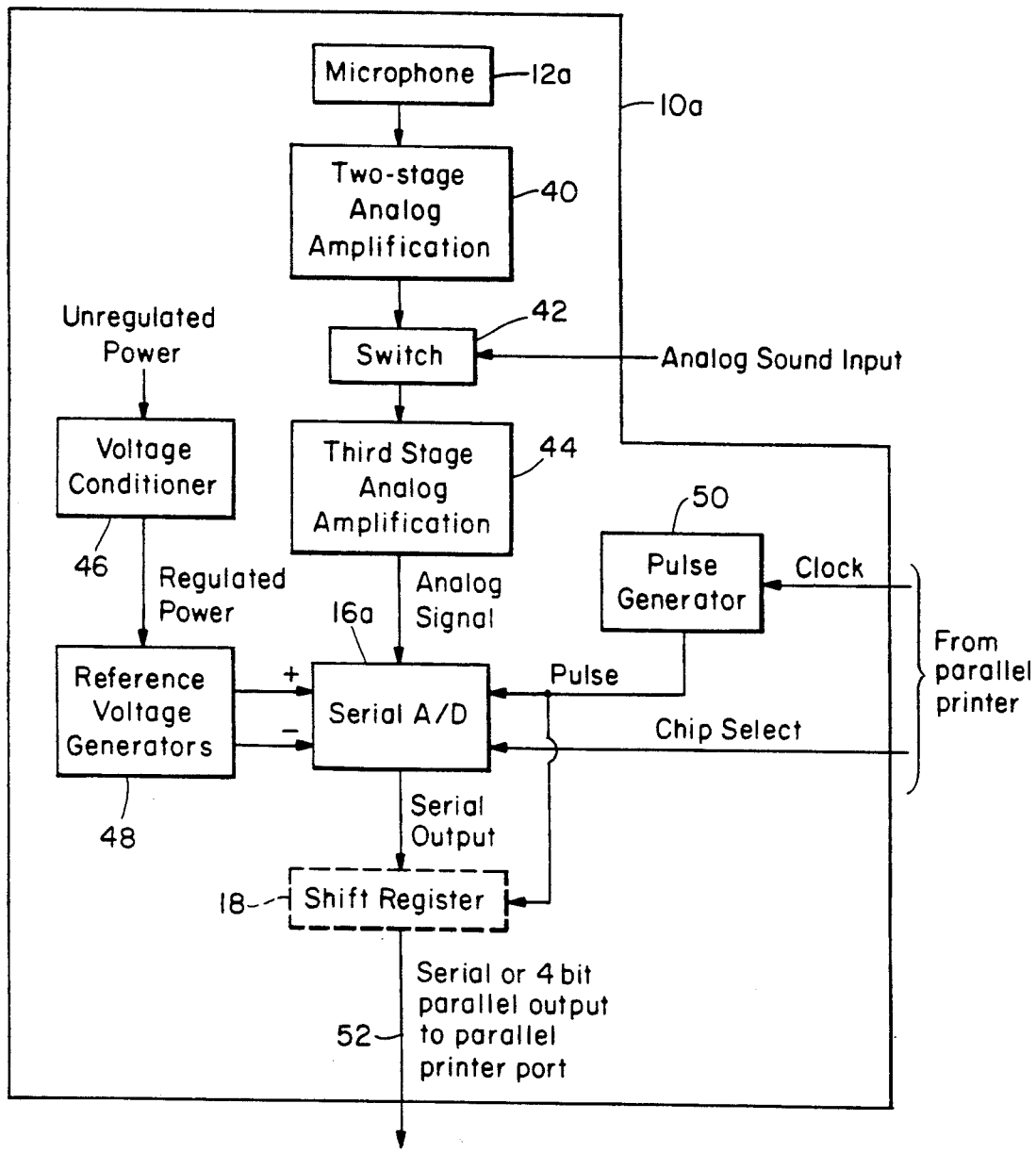
FIG. 2 is a more detailed schematic diagram of an alternative embodiment of the external hand-held device of the system of FIG. 1.

FIG. 2 details a preferred embodiment of external hand-held device 10a according to this invention. In this embodiment, the analog amplification is accomplished with a three stage amplifier in which the sound from microphone 12a is passed through two amplification stages 40 and a third stage 44 before being provided to serial A/D 16a. Switch 42 is provided between the second and third amplification stages to allow the system to alternately accept an analog sound input from another source, such as prerecorded sound from a compact disc player. Since these prerecorded sound signals typically have a grater amplitude than those from a microphone, the input is provided just before the third stage of analog amplification 44.

The required positive and negative reference voltages are supplied to serial A/D 16a by means of voltage conditioner 46 and voltage generators 48. Voltage conditioner 46 takes in the unregulated power from a separate power supply or from the computer through an output pin of the parallel printer port, and provides regulated power to generators 48, which in turn provide two different levels of reference voltage necessary for serial A/D 16a. Serial A/D 16a is enabled to convert the analog signal into data bits and output the bits serially under control of the "pulse" and "chip select" control signals derived by the software resident in controller 22 within the computer. The chip select control signal is provided to enable serial A/D 16a to begin the conversion of the analog signal into eight digital bits. Thus, one byte is created for each chip select signal.

The conversion and serial delivery of the eight bits of each byte is accomplished under control of square wave pulses generated by pulse generator 50 in response to clock signals supplied from the computer under software control. Preferably, the leading edge of each pulse is used to enable the creation of one bit from the analog sound signal, and the trailing edge of each pulse is used to read out the created bit. The pulse may be used in one embodiment to enable shift register 18 to accumulate up to four bits so that the bits can be delivered in groups of four through cable 52 to the parallel printer port of the computer, thus increasing the system operating speed. Since each pulse preferably enables the conversion and output from A/D 16a of a single bit, eight pulses are required to create each byte. By using pulse generator 50, which creates a two-transition pulse from a single-transition clock signal, the system can operate with only half of the software generated write signals (clock signals), which would otherwise have to be used individually to accomplish both the digitization and output functions of serial A/D 16a. This provision allows the system to sample at up to 22,000 times per second, sufficient for a high quality sound signal. In another embodiment, without shift register 18, the bits are supplied serially directly from A/D 16a through cable 52 into the computer memory through the parallel printer port.

Figure 3:
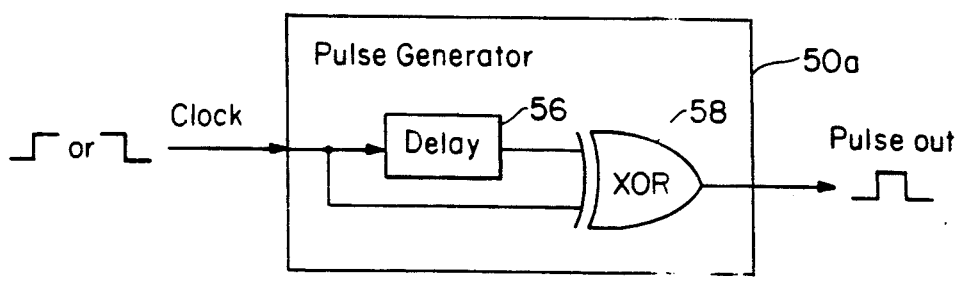
FIG. 3 is a more detailed schematic diagram of the pulse generator of FIG. 2.

FIG. 3 details pulse generator 50a that provides at its output a two-transition pulse from a single clock signal. Signal delay 56 causes the signal at one pin of exclusive or gate 58 to lag behind the clock signal, thus creating an output pulse from a single clock signal to effectively double the system conversion speed in relation to the clock rate.

Figure 4:
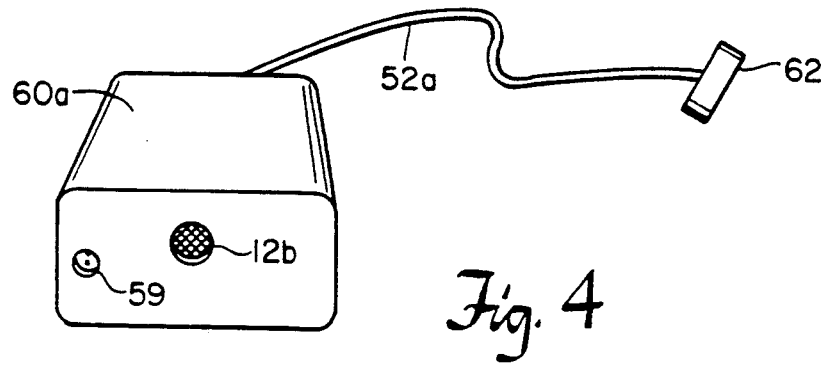
FIG. 4 is a front view of the external hand-held device, cable, and parallel printer port connector of this invention.

One appearance of hand-held enclosure 60a according to this invention is shown in FIG. 4. Enclosure 60a includes built in microphone 12b along with the remainder of the circuitry shown in FIG. 2. Input jack 59 provides the means for analog sound input to switch 42, FIG. 1. The device does not include an oscillator within enclosure 60a, instead taking advantage of the oscillator available in the personal computer. By not having an oscillator in the same enclosure as the sampling and digitization circuitry, the system provides an interference-free signal which has much better sound quality than other devices with an internal oscillator, and also substantially reduces radio frequency interference transmitted to other devices such as radio or television. Cable 52a carries the data from enclosure 60a through parallel printer port connector 62 to the computer, not shown, as well as the clock and control signals from the computer to the circuitry within enclosure 60a.

Software main routine 70 according to this invention, resident within controller 22, FIG. 1, is shown in FIGS. 5A and 5B. The program begins with step 72, in which the user-selected sound sample rate and storage location are retrieved. Preferably, the system is enabled to sample at rates of 22K, 11K, 7.33K and 5.5K bytes per second to allow the user to select an appropriate sound quality as well as have control over the amount of memory which must be provided to store the sound signal. The memory location selection is provided so that the digitized sound data can be recorded either in the working memory of the computer or in other storage such as the computer hard disk. In step 74 the system allocates data area in the working computer memory to initialize two reasonably-sized I/O buffers so that the system can double buffer the data. In step 76, the system reserves space at the beginning of the output file for a file header that may include the file name, sample rate, options such as data location, and file length, for example.

The actual operation of routine 70 begins with step 78, in which the internal timer interrupts of the computer's oscillator are turned off. At step 80 the computer timer interrupt is changed to this sound recording routine from its current use, typically for keeping track of the time of day and date. The interrupt rate is then changed to the desired sample rate, step 82, and the interrupt is turned back on, step 84. For each interrupt, the system then executes in parallel with the main routine interrupt routine 100, described in more detail below in conjunction with FIG. 6.

After interrupts are enabled, step 84, and if an interrupt has been issued, steps 85, 87, the interrupt routine is executed, step 89. While there are no errors in the execution of the digitization and storage of the analog sound signal, or no termination requests received from the user, step 88, the execution of the interrupt routine continues. When a buffer fills, the interrupt routine switches buffers and starts filling the empty buffer, while the main routine empties the now filled buffer to memory (such as a hard disk), step 92. When an error is detected, or the sound digitization process has been completed, the system restores the interrupt function and rate to its original function and rate, step 94, and writes the final file header to the previously reserved output space, step 96, at which time the routine ends.

Interrupt routine 100, FIG. 6, begins by saving all registers likely to be modified in the routine, step 102, and then generating a "chip select" control signal and transmitting the signal to the A/D converter, step 104. Thus, a chip select signal is provided for each byte. The system at step 106 then generates from the oscillator a clock transition, and sends the transition to the pulse generator. There is one pulse required to accomplish both the digitization and reading of each of the eight bits of each word. When the four bit shift register is used, four pulses will be used to generate and assemble in the shift register the four bits that are read as a group into the computer through the parallel printer port. At step 108, the bits are read serially or in groups of four from the external hand-held device through the parallel printer port to the I/O buffer currently being filled. When all eight bits have been read, the chip select signal is negated, step 110, the eight bits are saved in the buffer, and the buffer index is incremented, step 112. If the buffer is not full, step 114, the registers are restored, step 120, and operation returns to step 102. When the buffer currently being written does fill, the flags are set to indicate that the buffer is full, step 116, and the system switches to the second I/O buffer, step 118, to begin filling that buffer.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A hand-held sound digitizer system for recording sound in a personal computer, comprising:
   an enclosure capable of being held in one hand;
   a microphone built into said enclosure for providing an analog sound signal output;
   means within said enclosure for digitizing said analog signal output;
   means for providing the digitized output to a parallel printer port of the computer and
   controller means resident within the computer enabling said means for digitizing to allow transfer of said digitized output to said parallel printer port by way of said means for providing to store said digitized output in the computer.

2. The sound digitizer system of claim 1 in which said means for digitizing includes an A/D converter.

3. The sound digitizer system of claim 2 in which said A/D converter provides serial data output.

4. The sound digitizer system of claim 3 in which said means for providing includes means for reading the serial data output into the computer.

5. The sound digitizer system of claim 4 in which said means for reading includes means for assembling a plurality of data bits.

6. The sound digitizer system of claim 5 in which said means for reading includes means for transferring said assembled data bits as a group to the parallel printer port.

7. The sound digitizer system of claim 5 in which said means for assembling includes a shift register.

8. The sound digitizer system of claim 5 in which said plurality of bits is four bits.

9. The sound digitizer system of claim 4 in which said means for reading includes means for serially transferring data bits to the parallel printer port.

10. The sound digitizer system of claim 4 in which said means for digitizing includes pulse generator means for providing a pulse to said A/D converter for generating a data bit from the microphone output.

11. The sound digitizer system of claim 10 in which the pulse leading edge enables said A/D converter.

12. The sound digitizer system of claim 5 in which said means for digitizing includes pulse generator means for providing a pulse to said means for assembling for generating a data bit from the microphone output.

13. The sound digitizer system of claim 12 in which the pulse trailing edge enables said means for assembling.

14. The sound digitizer system of claim 1 further including means within said enclosure for amplifying the microphone output before digitization.

15. The sound digitizer system of claim 1 further including input means within said enclosure for accepting an analog sound signal and providing an analog sound signal output, distinct from said microphone analog sound signal output, for said means for digitizing.

16. A hand-held sound digitizer system for recording sound in a personal computer, comprising:
    an enclosure capable of being held in one hand;
    a microphone built into said enclosure for providing analog sound signal output;
    means for amplifying said microphone output;

a serial A/D converter for digitizing said amplified analog sound signal output;

controller means resident within the computer for enabling said serial A/D converter to provide a digitized output; and means for reading the digitized output through a parallel printer port of the computer into the computer memory.

17. A hand-held sound digitizer system for recording sound in a personal computer; comprising:

an enclosure capable of being held in one hand;

a microphone built into said enclosure for providing an analog sound signal output;

means for amplifying said microphone output;

a serial A/D converter for digitizing said amplifier analog sound signal output;

means for assembling a plurality of sound signal bits into a group of bits; and controller means resident within the computer for generating a pulse for enabling both said serial A/D converter and said means for assembling to both digitize said analog signal and transfer into the computer said group of bits through a parallel printer port of said computer.

* * * * *